United States Patent [19]

Prater

[11] Patent Number: 4,780,380
[45] Date of Patent: Oct. 25, 1988

[54] POROUS LITHIUM ELECTRODES AND THEIR USE IN NONAQUEOUS ELECTROCHEMICAL CELLS

[75] Inventor: Keith B. Prater, North Vancouver, Canada

[73] Assignee: Standard Oil Company (Indiana), Chicago, Ill.

[21] Appl. No.: 618,243

[22] Filed: Jun. 7, 1984

[51] Int. Cl.$^4$ .................... H01M 6/16; H01M 4/04
[52] U.S. Cl. .................... 429/194; 429/199; 429/201; 429/218; 29/623.1
[58] Field of Search ............. 429/194, 197, 198, 199, 429/201, 209, 218; 204/280, 290 R, 59 AM; 427/430.1; 29/623.1; 502/344

[56] References Cited

U.S. PATENT DOCUMENTS

| | | | |
|---|---|---|---|
| 2,863,933 | 12/1958 | Minnick et al. | 429/50 |
| 2,937,219 | 5/1960 | Minnick et al. | 429/196 X |
| 3,408,229 | 10/1968 | Posey, Jr. et al. | 429/29 |
| 3,508,967 | 4/1970 | Lyall et al. | 429/217 |
| 3,567,515 | 3/1971 | Maricle et al. | 429/105 |
| 3,923,543 | 12/1975 | Auborn | 429/196 |
| 4,056,885 | 11/1977 | Rao | 29/623.1 |
| 4,086,402 | 4/1978 | Feuillade | 429/197 X |
| 4,091,152 | 5/1978 | Rao et al. | 429/101 |
| 4,299,890 | 11/1981 | Rea et al. | 429/218 X |
| 4,352,866 | 10/1982 | Klinedinst et al. | 429/101 |
| 4,359,404 | 11/1982 | Grey et al. | 502/157 |
| 4,400,453 | 8/1983 | Blomgren et al. | 429/197 |
| 4,409,730 | 10/1983 | Goebel | 429/218 X |
| 4,431,718 | 2/1984 | Bernard et al. | 429/105 |
| 4,495,258 | 1/1985 | Mehaute et al. | 429/103 |
| 4,520,084 | 5/1985 | Tinker et al. | 429/197 |

OTHER PUBLICATIONS

Pompe, Electrodeposition of alkali metals from non-aqueous solvents in a horizontal mercury cell at room temperature and lower.

*Primary Examiner*—Anthony Skapars
*Attorney, Agent, or Firm*—Richard A. Kretchmer; William H. Magidson; Ralph C. Medhurst

[57] ABSTRACT

Porous lithium electrodes for use in nonaqueous electrochemical cells are prepared by depositing lithium from solution in liquid ammonia.

14 Claims, No Drawings

POROUS LITHIUM ELECTRODES AND THEIR USE IN NONAQUEOUS ELECTROCHEMICAL CELLS

BACKGROUND OF THE INVENTION

1. Field of the Invention

This invention relates to a method for the preparation of high surface area lithium electrodes for use in electrochemical cells. More particularly, it relates to the preparation of porous lithium electrodes by deposition of the lithium from solution in liquid ammonia.

2. Description of the Prior Art

A substantial amount of interest has recently been centered on the development of ambient temperature, high energy density, electrochemical cells which are light in weight and capable of providing a higher voltage than conventional cells such s nickel-cadmium and lead-acid systems or alkaline cells having zinc anodes. The high energy density cell systems which are currently of interest typically involve the use of active metals (metals above hydrogen in the electromotive series of elements which are unstable in an aqueous environment) as anodes in combination with nonaqueous electrolytes. As used herein, "nonaqueous" is intended to mean substantially free of water.

In conventional electrochemical cells, cathode depolarizers are used in a form which will permit an intimate and maximum contact with an external electrical circuit, such as a set of wires connecting the electrodes of a cell, while also effecting a physical separation of the cathode depolarizer from the anode. In such cells, the cathode depolarizer is generally an insoluble, finely divided solid which is either admixed with or used as a coating over an inert conducting material, such as nickel, graphite or carbon rod, which serves as a current collector or cathode. The physical separation of the cathode depolarizer from the anode is necessary to prevent a direct chemical reaction between the anode material and the cathode depolarizer which would result in self-discharge of the cell.

Until recently, it was generally believed that a direct physical contact between the cathode depolarizer and the anode could not be permitted within an electrochemical cell. It has been discovered, however, that certain cathode depolarizers do not react chemically to any appreciable extent with active metal anodes at the interface between the anode and the cathode depolarizer. Accordingly, with materials of this type, it is possible to construct an electrochemical cell wherein an active metal anode is in direct contact with the cathode depolarizer. For example, U.S. Pat. No. 3,567,515 issued to Maricle et al. on Mar. 2, 1971, discloses the use of sulfur dioxide as a cathode depolarizer in such a cell. Similarly, U.S. Pat. No. 3,926,669 issued to Auborn on Dec. 16, 1975, discloses that certain liquid inorganic oxyhalides and thiohalides, such as thionyl chloride, sulfuryl chloride and phosphorus oxychloride, can be utilized as cathode depolarizers in such a cell.

Consistent with the disclosure of Maricle et al. in the above-mentioned U.S. Pat. No. 3,567,515, ultra-pure lithium electrodes prepared by vapor deposition of lithium on a glass substrate are stable when placed in direct contact with an electrolyte which comprises sulfur dioxide and in which the dithionite discharge product is soluble. However, we have found that a relatively rapid self-discharge usually occurs when the lithium electrode is fabricated from bulk samples of commercially supplied lithium. For example, when commercial lithium foil is placed in an electrolyte which comprises sulfur dioxide and in which the dithionite discharge product is soluble (dithionite anion is the sulfur dioxide reduction product), one usually observes one or more spots appearing on the lithium surface from which a red to black colored material is released. In some cases, only a few such spots will appear. More typically, however, large areas of the lithium electrode will be covered with such spots. When the lithium electrode is coupled with a carbon cathode, the open circuit voltage of the resulting electrochemical cell decays rapidly as a consequence of the self-discharge process. This self-discharge represents a major obstacle to the construction of a satisfactory electrochemical cell which comprises an active metal anode, a sulfur dioxide cathode depolarizer, and an electrolyte solution in which the dithionite discharge product is soluble. The prior art fails to disclose any method for either the control or prevention of this self-discharge.

High surface area active metal electrodes are highly desirable for use in high energy density cell systems for a variety of reasons. For example, high surface area electrodes provide higher currents and, accordingly, permit the delivery of greater power from both primary (nonrechargeable) and secondary (rechargeable) cells during discharge. In those cases wherein an insoluble product is produced during discharge and deposited on the active metal electrode, high surface area electrodes provide a greater discharge capacity before the active surface becomes coated. Further, high surface area electrodes are generally porous in nature. In rechargeable secondary cells, this porous nature permits the retention of any insoluble discharge product within the pores and thus facilitates the recharge process. This retention of the discharge product near the electrode in secondary cells serves to reduce electrode shape change during recharge, thereby extending cycle life.

The alkali metals and, to a lesser degree, calcium, strontium, barium, europium and ytterbium are soluble in liquid ammonia. The resulting solutions are blue in color when dilute and are bronze or metallic appearing at metal concentrations of about 3 molar or above. In the dilute solutions, it is generally believed that the metal is dissociated into solvated metal ions and electrons. The more concentrated bronze appearing solutions possess physical properties, such as a metallic luster and an exceedingly high electrical conductivity, which resemble those of liquid metals. The foregoing metals are also soluble, to varying degrees, in amines. In addition, it is known that lithium, sodium and potassium are soluble in hexamethylphosphoramide, a compound which has the formula $[(CH_3)_2N]_3PO$.

A procedure for the preparation of alkali metal and alkaline earth metal dispersions in hydrocarbon liquids has been developed which is based on the solubility of these metals in liquid ammonia. This procedure involves dispersing an ammonia solution of the metal in a hydrocarbon liquid and allowing the ammonia to evaporate (see I. Fatt and M. Tashima, *Alkali Metal Dispersions*, D. Van Nostrand Co., Inc., 1961, pp. 65–70). Similarly, C. M. Stupak disclosed at the Colloque Weyl (June 26–July 1, 1983, at Pacific Grove, Calif.) that lithium can be purified by filtering a saturated ammonia solution of this metal and recovering the metal by evaporation of the ammonia.

SUMMARY OF THE INVENTION

The present invention is directed to the discovery that high surface area lithium electrodes for use in electrochemical cells can be prepared by deposition of the lithium metal from solution in liquid ammonia. In addition, it has also been found that such an electrode has a substantially reduced tendency to undergo self-discharge when it is placed in contact with a cathode depolarizer with which it should be compatible.

One embodiment of the invention is a nonaqueous electrochemical cell comprising in combination: (a) a cathode; (b) a cathode depolarizer; (c) a nonaqueous, conductive electrolyte; and (d) an electrode comprising porous lithium which is formed by deposition from solution in liquid ammonia.

Another embodiment of the invention is an electrochemical cell comprising in combination: (a) a cathode; (b) a nonaqueous, conductive, liquid electrolyte which comprises a cathode depolarizer; and (c) a solid electrode comprising porous lithium which is formed by deposition from solution in liquid ammonia.

An object of the invention is to provide an improved electrochemical cell.

Another object of this invention is to provide an improved lithium electrode for use in nonaqueous electrochemical cells.

Another object of this invention is to provide a lithium electrode having an increased surface area.

A further object of this invention is to provide a lithium electrode which has a reduced tendency to self-discharge when combined with a cathode depolarizer with which it should be compatible.

DETAILED DESCRIPTION OF THE INVENTION

It has been found that high surface area, porous lithium electrodes for use in nonaqueous electrochemical cells can be prepared by deposition of lithium metal from solution in liquid ammonia.

In the practice of this invention, lithium is dissolved in liquid ammonia at a temperature which is typically at or below about $-33°$ C., the boiling point of ammonia at a pressure of one atmosphere. However, higher temperatures can be utilized either through the use of higher pressures or by the use of a higher boiling diluent. The lithium is then deposited or precipitated from solution by evaporation of some or all of the ammonia solvent. It will be appreciated, of course, that evaporation of the ammonia can be carried out at any suitable combination of temperature and pressure. If desired, the lithium solution can be filtered, decanted or centrifuged prior to evaporation in order to remove any undissolved lithium or insoluble impurities.

In one embodiment of the invention, not all of the ammonia solvent is evaporated from the lithium solution and, accordingly, not all of the lithium is precipitated. In this embodiment, impurities can be concentrated in the residual ammonia solution and a very high purity porous lithium deposit obtained.

Lithium has the ability to react with both water and atmospheric nitrogen. Accordingly, in the practice of this invention, it is desirable to prevent any contact with moisture and handling is preferably carried out in a substantially anhydrous environment. In addition, the lithium should be handled in a substantially nitrogen free environment if nitride formation is to be avoided. However, some nitride formation does not appear to be detrimental to the lithium electrodes of this invention.

If desired, a diluent can be utilized in combination with the liquid ammonia. The diluent need not be miscible with the liquid ammonia but must be a liquid under the conditions of use and also must be substantially inert under the conditions of use. Suitable diluents include, but are not limited to, hydrocarbons and ethers such as pentane, hexane, toluene, diethyl ether and tetrahydrofuran. The use of a diluent provides a method for exerting some control over the morphology of the lithium which is deposited from ammonia solution. For example, if a diluent is utilized with vigorous stirring and the diluent has a higher boiling point than ammonia, evaporation of the ammonia yields a precipitate of lithium in the form of a porous particulate solid. If desired, this porous particulate lithium can be fabricated into a paste or a compact for use as an electrode in the electrochemical cell of this invention.

A preferred embodiment of the invention involves the deposition of lithium from ammonia solution in the absence of any diluent. This typically results in the deposition of a solid mass of porous lithium which can be shaped into any desired form by conventional techniques, for example, by compression or sintering.

In view of the ease with which deposits of porous lithium can be prepared by evaporation of an ammonia solution of lithium, a highly preferred embodiment of the invention involves the use of a composite electrode wherein the porous lithium is utilized as a coating which has been deposited on a solid substrate. The substrate can be either an electrically conducting material or an insulating material and can be of any desired shape. Suitable substrates include, but are not limited to, insulators such as glass, ceramics and organic polymers, and conductors such as metals and carbon or graphite. It will be appreciated, of course, that such substrates must be substantially inert with respect to lithium and the lithium-ammonia deposition system. In addition, the use of a conducting substrate is not usually preferred in those situations where a simultaneous contact of both substrate and the lithium coating with an electrolyte can cause self-discharge of the electrode.

Metals represent a preferred conducting substrate for the porous lithium of this invention since the metal substrate serves to provide the porous lithium with mechanical strength and also provides a convenient electrical contact. Suitable substrate metals include lithium, titanium, nickel, silver, vanadium, chromium, molybdenum, manganese, copper and zinc. Preferred metallic substrates comprise at least one metal selected from the group consisting of lithium, titanium, nickel, vanadium, chromium, manganese and copper. Nonporous lithium is a particularly preferred substrate.

Electrically insulating substrates such as glass, ceramics and solid organic polymers are suitable supports for the porous lithium of this invention. Preferred supports of this type are generally somewhat porous or have a rough surface in order to promote the adhesion of the porous lithium coating.

When a film or surface coating of porous lithium is deposited on a substrate for use in the practice of this invention, the coating can be of any desired thickness. In addition, the thickness of this coating can be easily controlled by controlling the amount of ammonia evaporated from the lithium solution which is used for deposition. When the desired amount of lithium has been deposited on the substrate, the resulting electrode is removed from contact with the lithium solution. Residual traces of liquid ammonia can then be removed from the resulting electrode by evaporation if desired.

Although the subject invention is not to be so limited, it is believed that commercially supplied bulk samples of lithium carry significant amounts of surface impurities. In addition, the fabrication of lithium into electrodes for use in electrochemical cells carries with it the probability that additional impurities will be attached to the surface of the resulting electrode. For example, mere contact with a cutting tool can serve to contaminate the electrode surface. When a lithium electrode is utilized in an electrochemical cell wherein it is in direct contact with a cathode depolarizer with which it should be compatible, particulate surface impurities can act as small cathodes which are in direct electrical contact with the active metal electrode. As a consequence, self-discharge can take place.

In comparison with bulk samples of commercial lithium, porous lithium electrodes prepared in accordance with this invention have a substantially reduced tendency to undergo self-discharge when they are placed in an electrolyte which comprises sulfur dioxide and in which the dithionite discharge product soluble It is believed that a porous lithium electrode prepared in accordance with this invention is substantially free of the surface contaminants which are typical of bulk samples of commercial lithium. Any such contaminants, originally associated with the lithium from which the ammonia solution of this invention is prepared, appear to be either insoluble in liquid ammonia or are rendered harmless by the process of this invention.

In addition to having a substantially reduced tendency to undergo self-discharge, the lithium electrodes prepared in accordance with this invention are porous and possess a very large surface area. When viewed under a microscope, the lithium which is deposited from ammonia solution in accordance with this invention is sponge-like in appearance. When compared with a foil electrode of substantially the same size, the porous lithium electrode of this invention has the ability to provide a substantially greater current density during discharge.

The cathode of the electrochemical cell can be constructed of any material which is electrically conducting and is substantially inert to the electrolyte system. In addition, the cathode material is desirably catalytic with respect to electroreduction of the cathode depolarizer. Preferred materials include metals of the platinum group family, consisting of platinum, iridium, osmium, palladium, rhodium and ruthenium; carbon in any of its common electrode forms such as sintered, compacted or powdered graphite or carbon rod; iron in its various forms, particularly as stainless steel; titanium, nickel, silver, mercury, lead and gold. Less preferred materials are metals of the families of vanadium, chromium and manganese [Groups 5b, 6b and 7b of the Periodic Table of Elements (*Handbook of Chemistry and Physics*, 57th ed., 1976-77, P. B-4)]; zirconium, cobalt, copper, zinc, cadmium, germanium, tin, antimony and bismuth; certain nitrides such as boron nitride; and semi-conductors such as silicon. These materials can be used in any of the forms which are conventional in the art, such as rods, compacts, powders, pastes and the like.

The electrochemical cell of this invention comprises a cathode depolarizer which is electrochemically reduced at the surface of the cathode during discharge of the cell. Preferred cathode depolarizers include all materials which are stable when in direct contact with the lithium anode and are also capable of being electrochemically reduced at the cathode during discharge of the electrochemical cell. These preferred cathode depolarizers are typically used as a component of the electrolyte. However, it will be appreciated that the cathode depolarizer can be physically separated from the lithium electrode if desired. Suitable cathode depolarizers include, but are not limited to, sulfur dioxide and covalent inorganic oxyhalides and thiohalides. Examples of such oxyhalides and thiohalides include phosphorus oxychloride, monofluorophosphoryl dichloride, monobromophosphoryl dichloride, phosphorus oxybromide, thiophosphoryl chloride, thiophosphoryl bromide, thionyl chloride, thionyl bromide, sulfuryl chloride, selenium oxychloride and mixtures thereof. Preferred cathode depolarizers include sulfur dioxide, thionyl chloride, sulfuryl chloride and phosphorus oxychloride.

In the absence of any surface contamination on the lithium electrode which can initiate self-discharge, certain cathode depolarizers are stable when in contact with this electrode. Although the reasons for this are not well understood, it is believed that the lithium electrode reacts with a small amount of the cathode depolarizer to form a thin film of the reaction product on the electrode surface which serves to prevent any further molecules of cathode depolarizer from reaching the lithium metal of the electrode. For example, in the case of sulfur dioxide as the cathode depolarizer, it is believed that the lithium anode is passivated by the formation of a thin film of lithium dithionite ($Li_2S_2O_4$) which then prevents further sulfur dioxide molecules from reaching the anode surface and thereby prevents self-discharge. Nevertheless, this thin film permits electrochemical oxidation and reduction of the lithium anode to take place during operation of the cell by passage of lithium cations through the film. At the same time, sulfur dioxide reduction products are formed at the cathode during discharge of the cell.

Suitable electrolytes for use in the electrochemical cell of this invention can be of any conventional type and in any conventional form, for example, liqiid, paste or solid. Preferably, the electrolyte comprises a liquid cathode depolarizer having dissolved therein at least one, and ordinarily more than one, electrolyte salt which is substantially inert to the other cell components. Such salts are selected and utilized in amounts which are effective to provide an adequate conductivity for efficient operation of the electrochemical cell. Suitable electrolyte salts include, but are not limited to, alkali metal salts, alkaline earth metal salts, salts derived from metal cation complexes, quaternary ammonium salts, phosphonium salts, pyridinium salts and arsonium salts.

Electrolyte salts having lithium cations and large anions which are stable to oxidation and reduction are particularly useful. Examples of such materials include lithium perchlorate, lithium dithionite, lithium sulfate, lithium tetrafluoroborate, lithium hexafluorophosphate, lithium bromide and lithium chloride.

Salts derived from metal cation complexes which are suitable for use as electrolyte salts preferably contain at least one anion selected from the group consisting of perchlorate, tetrafluoroborate, hexafluorophosphate, dithionite, sulfate, phosphate, chloride, bromide and fluoride. Preferred metal cation complexes are metal cations which are associated with one or more organic ligands or chelating agents. It will be appreciated, of course, that such coordinated or chelated metal cations should be free of acidic hydrogen atoms. Examples of suitable metal cation complexes include, but are not limited to, complexes of an alkali metal cation with a crown ether, such as Na(15-crown-5)+ complexes of an alkali metal cation with a cryptand, such as K($C_{18}H_{36}N_2O_6$)+, [Co(8-hydroxyquinoline)$_2$($NH_3$)$_2$]+, [Co(8-hydroxyquinoline)$_2$(2,2'-dipyridyl)]+, Mn(2,2'-dipyridyl)$_3$++, and Mn(1,10-phenanthroline)$_3$++. Of these examples, Mn(2,2'-dipyridyl)$_3$++ and Mn(1,10-phenanthroline)$_3$++ are particularly preferred.

Quaternary ammonium salts are highly suitable for use as electrolyte salts in the practice of this invention. Preferred quaternary ammonium salts are of the formula:

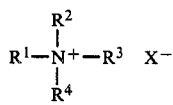

wherein $R^1$, $R^2$, $R^3$ and $R^4$ are independently selected from the group consisting of hydrocarbyl groups containing from 1 to 20 carbon atoms, and $X^-$ is selected from the group consisting of perchlorate, tetrafluoroborate, hexafluorophosphate, dithionite, sulfate, phosphate, chloride, bromide, iodide and fluoride. More preferably, $R^1$, $R^2$, $R^3$ and $R^4$ are independently selected from the group consisting of alkyl groups having from 1 to 10 carbon atoms, and $X^-$ is selected from the group consisting of perchlorate, tetrafluoroborate, hexafluorophosphate, dithionite, sulfate and bromide. Examples of suitable quaternary ammonium salts include tetrabutylammonium perchlorate, tetrahexylammonium perchlorate, tetramethylammonium tetrafluoroborate, and tetrapropylammonium hexafluorophosphate.

Phosphonium salts are highly suitable for use as electrolyte salts in the practice of this invention, and preferred phosphonium salts are of the formula:

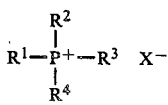

wherein $R^1$, $R^2$, $R^3$ and $R^4$ are independently selected from the group consisting of hydrocarbyl groups containing from 1 to 20 carbon atoms, and $X^-$ is selected from the group consisting of perchlorate, tetrafluoroborate, hexafluorophosphate, dithionite, sulfate, posphate, chloride, bromide, iodide and fluoride. More preferably, $R^1$, $R^2$, $R^3$ and $R^4$ are independently selected from the group consisting of alkyl groups of from 1 to 10 carbon atoms, and aryl and alkyl-substituted aryl groups of from 6 to 12 carbon atoms; and $X^-$ is selected from the group consisting of perchlorate, tetrafluoroborate, hexafluorophosphate, dithionite, sulfate and bromide. Examples of suitable phosphonium salts include tetrabutylphosphonium tetrafluoroborate, tetraphenylphosphonium perchlorate, and tetraphenylphosphonium hexafluorophosphate.

In addition to the cathode depolarizer and electrolyte salt or salts, the electrolyte for use in the electrochemical cell of this invention can additionally comprise one or more liquid organic or inorganic solvents or cosolvents which lack acidic hydrogen atoms and contain one or more atoms having at least one unshared pair of electrons. For the purposes hereof, "acidic hydrogen atoms" are those which are capable of being abstracted by the active metal electrode. However, strongly basic cosolvents such as amines are not generally desirable.

More specifically, suitable solvents and cosolvents are organic or inorganic liquids which contain at least one element which is selected from Groups 3a, 4a, 5a and 6a of the Periodic Table [*Handbook of Chemistry and Physics*, 57th ed. (1976–77), p. B-4]. Preferred elements from this group include, for example, boron, silicon, nitrogen, phosphorus, oxygen and sulfur as well as combinations of these elements. Organic solvents which contain two or more atoms of such elements in each molecule are particularly suitable.

Preferred liquid organic compounds for use as a solvent or cosolvent in the practice of this invention include, but are not limited to, trialkyl borates, boronic acid esters, borinic acid esters, tetraalkyl silicates, alkylalkoxyl silanes, nitroalkanes, alkylnitriles, dialkyl amides, lactams, tetraalkyl ureas, acetals, ketals, monocarboxylic acid esters, orthoesters, lactones, dialkyl carbonates, alkylene carbonates, orthocarbonates, monoethers, polyethers, monocarboxylic acid anhydrides, dialkyl sulfates, dialkyl sulfites, alkylene sulfites, and sulfones. Specific examples include triethyl borate, diethyl methylboronate, methyl diethylborinate, tetramethyl silicate, trimethoxymethylsilane, nitroethane, acetonitrile, dimethylformamide, 1-methyl-2-pyrrolidinone, tetramethyl urea, 1,1-diethoxyethane, 2,2-dimethoxypropane, ethyl acetate, trimethyl orthoformate, γ-butyrolactone, dimethyl carbonate, ethylene carbonate, tetramethyl orthocarbonate, diethyl ether, tetrahydrofuran, ethylene glycol dimethyl ether, acetic anhydride, dimethyl sulfate, dimethyl sulfite, ethylene sulfite, and tetramethylene sulfone.

The following examples are intended only to illustrate the invention and are not to be construed as imposing limitations on it.

EXAMPLE I

Two strips of lithium foil (Foote Mineral Co.) 0.10 cm thick, about 1.5 cm wide, about 7.7 cm long, and having a combined weight of 1.32 grams (0.19 mole) were dipped in 5.28 grams (0.31 mole) of liquid ammonia at −78° C. so that the end of each strip was submerged in the ammonia to a depth of about 2.5 cm. After a substantial amount of the submerged lithium had dissolved, the ammonia was distilled off under reduced pressure into a trap which was cooled at liquid nitrogen temperature. This resulted in the formation of a lustrous, silver colored deposit of lithium sponge on the interior walls of the container and on the partially dissolved strips of lithium foil. The resulting lithium sponge was exposed to a small pressure (about 20 cm of mercury) of dry nitrogen until most of the lithium visible against the container walls had developed a faint brown coloration, indicative of a lithium nitride coating. The nitrogen was then pumped off and the container filled with argon. The container was subsequently opened in a dry room wherein the relative humidity was maintained below 2%. The lower one-half to three-fourths of each lithium strip was found to be covered with a highly porous powder. On one side of each strip the powder was mostly black and brittle, suggesting a coating of crystalline lithium nitride, while the powder on the other side was light brown in color, suggesting the presence of an amorphous coating of lithium nitride.

EXAMPLE II

The two lithium strips from Example I having a coating of porous lithium were incorporated as anodes into an electrochemical cell which contained a stainless steel cathode, a micro-porous polypropylene (Celgard) covered, porous carbon cathode and an electrolyte which consisted of a sulfur dioxide solution which was 0.2 molar in tetrabutylammonium perchlorate and saturated (0.035 molar) in lithium perchlorate. The electrochemically active area of each lithium anode was 3.0 cm$^2$. The open circuit voltage of the cell for each lithium anode with respect to the stainless steel cathode was 3.09 volts. One of the lithium anodes initially showed one small red area of self-discharge while the other showed no trace of self-discharge. The ability of the electrochemical cell to function as a rechargeable cell was evaluated by subjecting each lithium anode to a series of ccharge/discharge cycles against the carbon cathode, where each cycle consisted of a 10 min. discharge period followed by a 10 min. charge period. One of the lithium anodes completed 96 cycles at a current density of 0.33 mA/cm$^2$, 47 cycles at a current density of 0.67 mA/cm$^2$, and 15 cycles at a current density of 1.67 mA/cm$^2$. The other lithium anode completed 96 cycles at a current density of 0.33 mA/cm$^2$.

EXAMPLE III

A portion of the lithium sponge which was deposited on the container walls in Example I was pressed into a rectangular shape having a thickness of less than 0.2 cm. This piece of lithium was then incorporated as an anode into an electrochemical cell which contained a stainless steel cathode, a micro-porous polypropylene (Celgard) covered porous carbon cathode, and an electrolyte which consisted of a sulfur dioxide solution which was 0.2 molar in tetrabutylammonium perchlorate and saturated (0.035 molar) in lithium perchlorate. The electrochemically active area of the anode wss 2.25 cm$^2$. The open circuit voltage of the lithium sponge anode with respect to the stainless steel cathode was 3.07 volts. The large surface area of this electrode was demonstrated by a better performance, in terms of polarization, than a vapor deposited lithium film electrode under identical conditions. For example, the lithium sponge electrode of this Example III afforded a current density of 22 mA/cm$^2$ at a polarization of 0.28 volt while the lithium film electrode afforded a current density of only 8.4 mA/cm$^2$ at the same polarization. Several small areas of self-discharge were initially observed on the lithium sponge electrode, but these eventually disappeared. The ability of the electrochemical cell to function as a rechargeable cell was evaluated by subjecting the lithium sponge electrode to a series of charge/discharge cycles against the carbon cathode, where each cycle consisted of a 10 min. discharge period followed by a 20 min. charge period at one-half the current density utilized during discharge. The anode completed 2210 cycles at a discharge charge current density of 0.89 mA/cm$^2$ and 162 cycles at a discharge current density of 0.45 mA/cm$^2$.

EXAMPLE IV

A strip of lithium having a width of 1.5 cm, a length of about 8 cm and a thickness of 0.25 mm was cut from a roll of foil obtained from Foote Mineral Co. A nickel tab was attached to one end of the strip to serve as an electrical connection, and the resulting structure was then dipped in a cyclohexane solution of ethylenepropylene-diene terpolymer to mask all but a 2.0 cm length at the end of the strip opposite from the nickel tab. The structure was then utilized as an anode in an electrochemical cell which contained a micro-porous polypropylene (Celgard) covered, porous carbon cathode and an electrolyte which consisted of a sulfur dioxide solution which was 0.2 molar in tetrabutylammonium perchlorate and saturated (0.035 molar) in lithium perchlorate. The open circuit voltage (OCV) of the cell as a function of time and the amount of the lithium anode surface area which was subject to self-discharge are set forth in the following tabulation:

| Time, hr. | OCV, volts | Anode Surface Area Subject to Self-Discharge, %$^a$ |
|---|---|---|
| 0 | 2.886 | 3 |
| 1.5 | 2.948 | 15 |
| 3.5 | 2.963 | 30 |
| 21.5 | 1.292 | 55 |
| 42.5 | 1.84 | 55 |

$^a$Self-discharge was indicated by the formation of red areas on the electrode surface with a red material streaming into the electrolyte from these areas.

The above-tabulated results serve to demonstrate the severe self-discharge whichis typically observed when the electrolyte of this Example IV is combined with commercial lithium foil.

I claim:

1. A nonaqueous electrochemical cell comprising in combination:
   (a) a cathode;
   (b) a cathode depolarizer;
   (c) a nonaqueous, conductive electrolyte; and
   (d) a solid electrode comprising a solid substrate having a coating of porous lithium wherein said coating of porous lithium is deposited onto the substrate by eveporation of ammonia from a solution of lithium in liquid ammonia in the presence of said substrate.

2. The electrochemical cell as set forth in claim 1 wherein said substrate is electrically conducting.

3. The electrochemical cell as set forth in claim 2 wherein said substrate comprises lithium.

4. The electrochemical cell as set forth in claim 1 wherein said substrate is electrically nonconducting.

5. The electrochemical cell as set forth in claim 4 wherein said substrate is selected from the group consisting of ceramics, glass and organic polymers.

6. An electrochemical cell comprising in combination:
   (a) a cathode;
   (b) a nonaqueous, conductive, liquid electrolyte which comprises a cathode depolarizer, wherein said cathode depolarizer comprises at least one material selected from the group consisting of sulfur dioxide, oxyhalides and thiohalides, and wherein said oxyhalides and thiohalides are covalent inorganic compounds; and
   (c) a solid electrode comprising a solid substrate having a coating of porous lithium wherein said coating of porous lithium is deposited onto the substrate by evaporation of ammonia from a solution of lithium in liquid ammonia in the presence of said substrate.

7. The electrochemical cell as set forth in claim 6 wherein said cathode depolarizer comprises a material selected from the group consisting of sulfur dioxide, thionyl chloride, sulfuryl chloride and phosphorus oxychloride.

8. The electrochemical cell as set forth in claim 6 wherein said electrolyte comprises a liquid cathode depolarizer having at least one electrolyte salt dissolved the rein which is substantially inert to said cathode depolarizer and said lithium.

9. The electrochemical cell as set forth in claim 8 wherein said electrolyte salt comprises a quaternary ammonium salt of the formula:

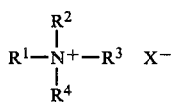

wherein $R^1$, $R^2$, $R^3$ and $R^4$ are independently selected from the group consisting of hydrocarbyl groups of from 1 to 20 carbon atoms, and $X^-$ is selected from the group consisting of perchlorate, tetrafluoroborate, hexafluorophosphate, dithionite, sulfate, phosphate, chloride, bromide, iodide and fluoride.

10. The electrochemical cell as set forth in claim 8 wherein the electrolyte salt comprises a lithium salt selected from the group consisting of lithium perchlorate. lithium dithionite. lithium sulfate. lithium tetrafluoroborate, lithium hexafluorophosphate, lithium bromide and lithium chloride.

11. The electrochemical cell as set forth in claim 6 wherein said cathode depolarizer comprises sulfur dioxide.

12. The electrochemical cell as set forth in claim 6 wherein said substrate comprises lithium.

13. The electrochemical cell as set forth in claim 6 wherein said electrolyte comprises liquid sulfur dioxide having at least one electrolyte salt dissolved therein which is substantially inert to said sulfur dioxide and said lithium.

14. The electrochemical cell as set forth in claim 13 wherein at least two electrolyte salts are dissolved in said sulfur dioxide and wherein one of said electrolyte salts is a lithium salt and the second is a quaternary ammonium salt.

* * * * *

UNITED STATES PATENT OFFICE
CERTIFICATE OF CORRECTION

Patent No. 4,780,380                    Dated  October 25, 1988

Inventor(s)  Keith B. Prater

It is certified that error appears in the above-identified patent and that said Letters Patent ise hereby corrected as shown below:

Column 1, line 18, "such s" should read -- such as--.

Column 5, line 24, "product soluble It" should read --product is soluble. It--.

Column 6, line 42, "liqiid" should read --liquid--.

Column 7, line 5, "complexs" should read --complexes--.

Column 9, line 19, "ccharge" should read --charge--.

Column 9, line 39, "wss" should read --was--.

Column 9, line 59, "discharge charge" should read --discharge--.

Column 10, line 26, "whichis" should read --which is--.

Column 11, line 6, "the rein" should read --therein--.

Column 12, lines 5 and 6, "perchlorate. lithium dithionite. lithium sulfate." should read --perchlorate, lithium dithionite, lithium sulfate,--.

Signed and Sealed this

Twentieth Day of June, 1989

Attest:

DONALD J. QUIGG

Attesting Officer          Commissioner of Patents and Trademarks